March 11, 1941.  K. MAYBACH  2,234,310
BRAKING DEVICE FOR MOTOR VEHICLE TRANSMISSIONS Filed April 4, 1938

Inventor:
KARL MAYBACH

Edmund H. Parry Jr
Attorney

Patented Mar. 11, 1941

2,234,310

UNITED STATES PATENT OFFICE 2,234,310

BRAKING DEVICE FOR MOTOR VEHICLE TRANSMISSIONS

Karl Maybach, Friedrichshafen, Bodensee, Germany, assignor to Maybach-Motorenbau G. m. b. H., Friedrichshafen, Bodensee, Germany Application April 4, 1938, Serial No. 200,001
In Germany May 3, 1937

16 Claims. (Cl. 188—71)

This invention relates to a braking device such as may be employed for automobile transmissions, to shorten the gear shifting period by slowing down the faster rotating of two parts of a transmission which are to be shifted into driving relation, and thereby quickly bringing said parts to substantially the same relative speed and permitting their engagement.

A primary object of the invention is to provide a braking device which will insure uniform engagement of various areas of the coacting braking surfaces, and to this end to provide a compensating mechanism which will automatically adjust itself under all conditions to equalize the braking forces applied to the brake parts.

A further object of the invention is to provide a braking device employing a novel type of actuating mechanism which is of extremely compact construction. The same readily lends itself to automobile transmissions which ordinarily are so arranged that only very limited space is available. The arrangement is such that the coacting braking parts may be placed in the transmission housing and the actuating mechanism located outside, preferably in a small auxiliary casing, and operated through the wall of the housing.

Another object of the invention is to provide a braking device incorporating transmitting means for distributing braking forces originating at a common source to a plurality of points of the coacting braking parts, and in which means the several forces react against and equalize each other in dependency on the conditions existing at different areas of the braking surfaces so that the effective braking pressure is the same at the several points of application.

Figure 1:
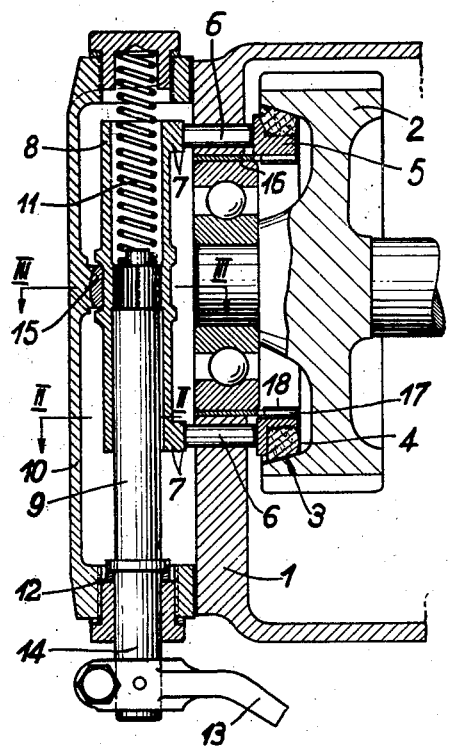
Figure 2:
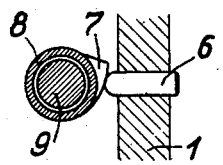
Figure 3:
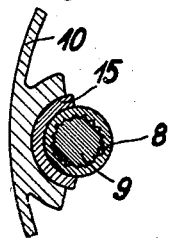

In the accompanying drawing, Fig. 1 is a more or less diagrammatic view largely in section of an exemplary embodiment of the invention; Fig. 2 is a sectional view taken on line II—II of Fig. 1; and, Fig. 3 is a similar sectional view taken on line III—III of Fig. 1.

The fragmentary casing portion 1 indicates one end of an illustrative automobile transmission housing. The gear 2 and its rotary supporting shaft represent the parts to be slowed down during shifting incident to bringing about driving engagement with another part (not shown) of the transmission.

The braking parts in the present construction are located inside the housing portion 1. One of such parts is provided by the inner peripheral surface 3 of the gear 2. A brake shoe 4 coactive therewith is carried by a supporting member 5, preferably a metal ring, which is fixed against rotation but movable axially to engage the shoe with the rotating gear surface 3.

The braking pressure is transmitted to ring 5 through pins 6 slidably mounted in the end wall of the housing by means of an external rotary actuating sleeve 8. Such sleeve as shown extends at right angles to, and diametrically of, the gear shaft, and the same may be enclosed in a compact auxiliary casing 10 fixed to the end of the transmission housing.

To insure uniform braking pressure and prevent jamming or irregular operation of the coacting braking parts, the rotary sleeve 8 is so mounted and driven that it may tilt relative to the braking parts. The take off of pressure is made from longitudinally spaced points on the sleeve and bearing means are provided which permit the shaft to tilt about a point located midway or substantially so between the take off points. The driving means for rotating the sleeve may take the form of a rigidly mounted rotating member, and in such case a flexible driving connection is employed between such member and the sleeve so as not to interfere with tilting movement of the latter.

In the present instance a single supporting bearing is employed which engages the rotatable sleeve 8 at its midpoint and acts as a fulcrum between the take off points, and connection with a rotatable driving shaft is also made at the midpoint. The sleeve is thus supported like a balance beam so that it can tilt as well as rotate. If due to conditions at the braking surfaces or other causes a greater actuating force tends to develop through one end of the sleeve than the other, the sleeve will swing transversely so that the first end is shifted away from the braking parts until the same effective forces exist at both ends and equilibrium is maintained throughout the length of the sleeve. In this manner it is possible to overcome the difficulties inherent in an actuating sleeve or shaft which is rigidly journaled, or one which is journaled at one of its ends and tilts objectionably under the torsional effects incident to rotation, in either of which cases equalized braking pressure can not be produced in the braking parts at the different points of application.

The several features of the sleeve 8 above referred to will be understood from the drawing. Extending internally of the sleeve is a rotary shaft 9 engaged at one end by spring 11 and bearing at its other end against packing 12 in casing 10. An actuating arm 13, which may be controlled through the gear shifting mechanism, connects with the extension portion 14 of shaft 9 and serves to rotate the same. Shaft 9 is of smaller diameter than the bore of sleeve 8 and is splined through suitable teeth to only the midpoint of the sleeve. Sleeve 8 is journaled in a single bearing comprising half ring 15 on the side of casing 10, such bearing also being located at the midpoint of the sleeve. Thus the sleeve is free to tilt axially to a limited degree on its bearing and relative to shaft 9, and can shift axially of the shaft.

The transmission of the braking force from sleeve 8 to pins 6 is made through suitable pressure applying elements such, for example, as cams 7. Such elements are longitudinally and equally spaced in opposite directions from the midpoint journal and driving connection with shaft 9, being located at or near the ends of sleeve 8. The pressure transmitted through the several pins is applied to diametrically opposite points of brake ring 5. Thus if shoe 4 tends to engage the surface of gear 2 with greater force at one point than another, sleeve 8 will tilt and thus automatically adjust and equalize the forces transmitted through the respective pins 6 so that a uniform braking pressure will be applied at the diametrically opposed areas of the braking surfaces.

As above mentioned, braking ring 5 while axially movable should be fixed against rotation. This can be done in various ways. As shown in Fig. 1, for example, a sleeve 16 may be secured in the wall of the housing provided with slots 17 slidably engaging ribs 18 formed on the inner periphery of ring 5, or again, ring 5 may be rigidly connected to the ends of pins 6.

I claim:

1. A braking device comprising a rotary braking element and an opposing non-rotary braking element, one movable axially into engagement with the other, an actuating member rotatable about its longitudinal axis and tiltable about a transverse axis, and a pair of diametrically opposed elements for applying braking pressure to circumferentially spaced points of the opposing braking elements under rotation of the actuating member operably connecting with the actuating member at points equally spaced in opposite longitudinal directions from the tilting axis of the actuating member.

2. A braking device comprising a rotary braking element and an opposing non-rotary braking element, one movable axially into engagement with the other, a rotatable actuating member, longitudinally spaced elements on said member for transmitting braking pressure to circumferentially spaced points of the opposing braking elements upon rotation of the member, and mounting means yieldingly supporting the actuating member for tilting movement in a plane parallel to the axis of the braking elements about a point midway between the spaced pressure transmitting elements.

3. A braking device comprising a rotary braking element and an opposing non-rotary braking element engageable therewith, a diametrically extending actuating member rotatable about its axis, longitudinally spaced elements on said member for transmitting braking pressure to diametrically opposite points of the opposing braking elements upon rotation of the member, and a bearing provided for tilting movement of the actuating member engaging said member at a point midway between the spaced pressure transmitting elements.

4. A braking device comprising a rotary braking element and an opposing non-rotary braking element engageable therewith, a rotatable actuating member, longitudinally spaced elements on said member for transmitting braking pressure to circumferentially spaced points of the opposing braking elements upon rotation of the member, and a half bearing providing for transverse rocking movement of the rotatable actuating member and engaging said member at a point midway between the pressure transmitting elements.

5. A braking device comprising a rotary braking element and an opposing non-rotary braking element, one movable axially into engagement with the other, an actuating member rotatable about its longitudinal axis and tiltable about a transverse axis in a plane parallel to the axis of the braking elements, longitudinally spaced elements for transmititng braking pressure to circumferentially spaced points of the opposing braking elements under rotation of the actuating member connecting with the actuating member at points longitudinally spaced in opposite directions from the tilting axis of said member.

6. A braking device comprising a rotary braking element and an opposing non-rotary braking element engageable therewith, a rotatable actuating member tiltable about its longitudinal midpoint, spaced elements engaging the actuating member on opposite sides of the midpoint, operating means for rotating the actuating member and a flexible driving connection between said operating means and the actuating member providing for tilting movement of the actuating member.

7. A braking device comprising a rotary braking element, an opposing non-rotary braking element movable axially into engagement therewith, a rotatable actuating member tiltable about its midpoint in a plane parallel to the axis of the braking elements, driving means connecting with the actuating member at its midpoint, and spaced elements for transmitting braking pressure to circumferentially spaced points of the opposing braking elements connecting with the actuating member at points spaced in opposite longitudinal directions from its midpoint.

8. A braking device comprising a rotary braking element, an opposing non-rotary braking element engageable therewith, a rotatable actuating member tiltable about its midpoint, a rotatable driving shaft flexibly connected to the midpoint of the actuating member for rotating the same, and spaced elements for transmitting braking pressure to circumferentially spaced points of the opposing braking elements connecting with the opposite ends of the actuating member.

9. A braking device comprising a rotary braking element, an opposing non-rotary braking element engageable therewith, a rotatable hollow actuating sleeve mounted for tilting movement about its longitudinal midpoint, a rotary driving shaft extending into the sleeve and connecting with the midpoint of the sleeve, and spaced elements for transmitting braking pressure to the braking elements connecting with the sleeve at points longitudinally spaced in opposite directions from its midpoint.

10. A braking device comprising a rotary braking element, an opposing non-rotary braking element engageable therewith, a rotatable actuating member, longitudinally spaced elements on said member for transmitting braking pressure to circumferentially spaced points of the opposing braking elements, a driving member connecting with the actuating member midway between the pressure transmitting elements, and mounting means supporting the actuating member for swinging movement at its midpoint about an axis extending transversely of the axis of the braking elements.

11. A braking device comprising a rotary braking element, an opposing non-rotary braking element engageable therewith, a rotatable actuating member, longitudinally spaced elements on said member for transmitting braking pressure to circumferentially spaced points of the opposing braking elements, a driving member connecting with the actuating member midway between the pressure transmitting elements, and a single bearing in which the actuating member is tiltable engaging the actuating member at its point of connection with the driving member.

12. A braking device comprising a rotary braking element, an opposing non-rotary braking element engageable therewith, a rotatable actuating member, a mounting engaging the longitudinal midpoint of the actuating member, driving means for rotating the actuating member connecting with the midpoint thereof, spaced cams at opposite ends of the actuating member, and means engageable with the respective cams for applying braking pressure to circumferentially spaced points of one of the braking elements.

13. A braking device for motor vehicle transmissions comprising a rotary braking element, an opposing non-rotary braking element engageable therewith, a hollow actuating sleeve, bearing means supporting said sleeve for tilting movement about its longitudinal midpoint relative to the braking elements, a rotatable driving shaft extending into the sleeve and connecting with the midpoint thereof, and cam means at the opposite ends of the sleeve for transmitting equalized braking pressure to spaced points of the braking elements.

14. A braking device comprising a rotary braking member and opposing non-rotary braking means, said parts being movable into braking engagement one with another, spaced elements for transmitting braking pressure to circumferentially spaced points of the movable of said braking parts, and an actuating member extending between the spaced pressure transmitting elements, said actuating member being rotatable axially to apply braking pressure through said spaced pressure transmitting elements to the circumferentially spaced points of the movable of said braking parts, and said actuating member being tiltable during its rotation in a plane parallel to the axis of the braking parts about a point intermediate the spaced pressure transmitting elements so as to equalize the pressure applied through the respective pressure transmitting elements.

15. A braking device comprising a rotary braking element and an opposing non-rotary braking element, one being movable axially into engagement with the other, a rotatable actuating member, longitudinally spaced elements on said member for transmitting braking pressure to circumferentially spaced points of the opposing braking elements upon rotation of the member, the actuating member being tiltable about an axis extending transversely of the axis of the braking elements in response to the forces transmitted through the respective spaced elements to equalize the pressure exerted by the respective transmitting elements on the braking elements.

16. A braking device for motor vehicle transmissions comprising a rotary braking element, an opposing non-rotary braking element engageable therewith, spaced elements for transmitting braking pressure in a direction axially of said braking elements to different circumferential areas of one of the braking elements, a rotatable actuating member engageable with the several pressure transmitting elements and operative to apply pressure simultaneously thereto, and means for equalizing the pressure applied by the actuating member to the pressure transmitting elements.

KARL MAYBACH.